United States Patent
Hamer

[15] 3,661,296
[45] May 9, 1972

[54] POT, PAN OR SIMILAR VESSEL FOR DOMESTIC USE WITH A HANDGRIP, AND A METHOD FOR MAKING SUCH A VESSEL

[72] Inventor: Emile Paul Eliza Hamer, 12 Princes Beautrixloan, Wezep, Netherlands

[22] Filed: Feb. 13, 1970

[21] Appl. No.: 11,064

[52] U.S. Cl. ..................220/94 A, 16/110 A, 24/73 HS, 219/148
[51] Int. Cl. .................................................B65d 25/28
[58] Field of Search ............220/94 R, 94 A; 16/110 A; 219/148; 24/73 HS

[56] References Cited

UNITED STATES PATENTS

| | | |
|---|---|---|
| 2,155,810 | 4/1939 | Tinnerman..................220/94 UX |
| 2,197,141 | 4/1940 | Belden..........................220/94 X |
| 2,150,247 | 3/1939 | Rodwick........................220/94 |
| 2,172,524 | 9/1939 | Stevens.......................220/94 UX |
| 2,482,614 | 9/1949 | Flora.........................16/110 A UX |
| 2,979,760 | 4/1961 | Sladky et al...................16/110 A |

Primary Examiner—M. Henson Wood, Jr.
Assistant Examiner—Michael Y. Mar
Attorney—Bucknam and Archer

[57] ABSTRACT

An assembly for attaching a handle or the like to a pot, pan or similar vessel consists of two metal parts secured to the walls of the vessel at circumferentially spaced locations. A handle of a generally U-shaped configuration has recesses in the legs thereof which receive the metal parts. Fastening means extend through the handle and engage the metal parts within the recesses to secure the handle to the metal parts in a manner so that no part of the handle is in contact with the vessel wall.

6 Claims, 4 Drawing Figures

PATENTED MAY 9 1972 3,661,296
Fig_1
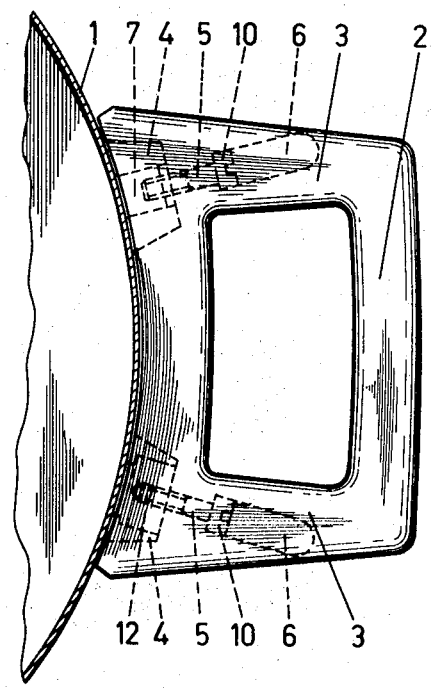
Fig_2
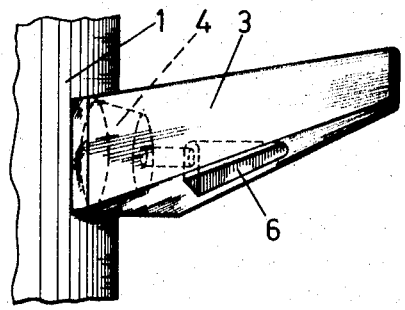
Fig_3
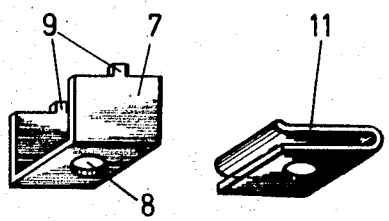
Fig_4
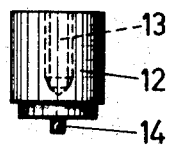

POT, PAN OR SIMILAR VESSEL FOR DOMESTIC USE WITH A HANDGRIP, AND A METHOD FOR MAKING SUCH A VESSEL

This invention relates to a pot, pan or similar vessel for domestic use with two metal parts such as sleeves connected to the wall of the vessel for instance by welding and positioned at a distance from each other along the periphery of the vessel, and with a handgrip with two recesses in the face bordering the wall of the vessel, said recesses engaging around said metal parts, connecting means such as screws, each extending through the handgrip and into an opening of said metal parts to connect the handgrip to the vessel, and moreover this invention relates to a method for making such a vessel.

Up to now in those cases in which a handgrip for instance of U-shape had to be mounted onto the wall of a pot, pan or other vessel for domestic use, two sleeves or a single bracket or strip were welded onto the wall of the vessel. The present invention relates to said first possibility and aims at improving it in such a way that the structure is particularly suited for handgrips consisting of ceramic and other somewhat brittle materials in which the danger exists that the screws or similar connecting means, if they are tensioned too much, cause cracks in the handgrip or breaking away of parts thereof. Moreover this invention aims at obtaining a simple way of manufacturing such vessels with connecting means such as sleeves or the like and to obtain an aesthetically attractive appearance of the vessel with the least possible chance of dirt and the like accumulating in and around the handgrip or handgrips.

To obtain these objects a vessel as given in the preamble is according to the invention characterized in that the said metal parts are positioned with their end faces remote from the vessel wall parallel to the adjacent wall part of the vessel, so that the axes of such metal parts and the axes of the screws or similar connecting means are perpendicular to the wall part of the vessel adjacent thereto and make an angle with one another. This has the particular advantage that simple sleeves or blocks may be used as the metal parts, which need not be provided with bevelled parts in their faces where they contact the wall of the vessel.

In particular the invention opens the possibility to secure such metal parts to the wall of the vessel by a so-called capacitor weld, i.e. an electric resistance weld using one or a small number of small protrusions at the ends of the metal parts bordering the wall of the vessel. In making such a capacitor weld a capacitor (condensor) of high capacity is loaded, one part, in this instance the said metal part, being connected with one terminal and the other of the parts is connected to the other terminal, and an electric current of high amperage flows through one or through a small number of contacting areas as soon as the parts to be connected are brought into contact. This has the additional advantage for pots or pans for domestic use in which at present often an internal coating of a plastic or other resinous material is used, that one of the terminals of the capacitor discharge device could be connected to the external surface of the wall of the pot or pan, which is not possible for a usual resistance spot weld or the like.

The screws or the like could when applying the invention be arranged easily in such a way that they are fully covered by the material of the handgrip and that they push with their heads upon parts in the legs of the handgrip where they find sufficient material in the handgrip so as to avoid the danger that parts thereof are broken by the pressure of the screw heads.

In many cases it is advantageous to realize the invention in such a way that the handgrip with the bottom of its recesses rests upon the end faces of the metal parts remote from the vessel wall. This avoids with certainty that the handgrip or the wall of the pot or vessel are damaged.

Preferably the sleeves or the like are constituted by U-shaped parts with three flat, mutually substantially perpendicular plane parts, the legs of the U being of equal length. In order to combine a simple manner of manufacture to the highest possible accuracy and uniformity in welding as to distribution of amperage and strength of the weld this aspect of the invention is preferably realized in such a way that the legs of the U intersect the same line of the wall of the vessel, which line in the height direction of said vessel is in the same plane as the center line thereof. The screw thread for taking up the screws needs not be arranged in said U-shaped parts themselves when applying such parts, but is preferably made in one leg of separate U-shaped bracket-like plate nuts each engaging with their legs around the central plane of a U-shaped part welded to the vessel. Such plate nuts in practice are often called speed nuts.

It is also possible to embody the metal parts as blocks of light metal with a closed bottom central bore which is screw-threaded. Such blocks could have a single central small protrusion in their plane bordering the wall of the vessel when making the capacitor weld, which protrusion melts during welding until the block will be in contact with the vessel wall with substantially all of its face bordering the vessel and thus will melt to said vessel along all of this face.

It is remarked that a U-shaped ceramic handgrip for a vessel for domestic use is known having a single metal strip welded to the wall of the vessel, said strip having an outer edge which is bent so as to take up an inclined position, set screws being introduced from below into screw-threaded openings of the handgrip and pressing with their conical end surface on said inclined outer edge of said strip whereby the grip is firmly pressed against the wall of the vessel.

This invention will now be explained in more detail with reference to the enclosed drawings. In said drawings:

FIG. 1 is a top view of a handgrip with a bordering part of a vessel for domestic use shown in horizontal section, said structure embodying the invention in a preferred manner;

FIG. 2 shows a side-view as seen in a horizontal direction of the handgrip with bordering part of the vessel according to FIG. 1;

FIG. 3 gives a perspective view of two parts used together for connecting a handgrip to a vessel according to the invention, about in conformity with the possibility given in dotted lines in the top part of FIG. 1; and FIG. 4 gives a metal block, being another possibility for realizing the invention to secure a handgrip to a vessel, corresponding to what is shown in the lower part of FIG. 1 in dotted lines.

In FIG. 1 reference numeral 1 shows part of the wall of a pot or pan or similar vessel for domestic use and 2 indicates a handgrip. This handgrip could consist of ceramic material such as steatite and it could be pressed from granular material, united or sintered and hardened by baking. In the two legs 3 of the handgrip recesses are made, which include a wide part 4 close to the wall of the vessel, a narrow cylindrical part 5 and a part 6, which opens in the manner shown in the lower face of the legs 3 of the handgrip. The part 4 could be conical or cylindrical and it could even be rectangular, although this in general is somewhat more difficult to manufacture.

It is essential for the invention that the parts shown in FIGS. 3 and 4 are positioned essentially radially as to their axes with respect to the wall of the vessel as clearly shown in FIG. 1. This makes it possible to connect these parts to the wall of the vessel by a capacitor weld without it being necessary that their face or faces coming into contact with the wall of the vessel in manufacture should be bevelled accurately or should be given another shape accurately to be determined and deviating from the normal flat shape perpendicular to their axes. Moreover by this flat shape it is much more easy to obtain a good weld because the electric current of the capacitor discharge does not meet with an undesired leakage path along a point of contact which was not devised but accidental and the weld will thus neither have dangerous parts where the bond is much less than in other zones.

To the left in FIG. 3 a U-shaped part 7 has been given having a central opening 8 and parallel legs of equal length, each leg at its free end having a small protrusion 9, with which this part 7 could be brought into contact with the wall of a vessel in order to be secured thereto by capacitor welding. During such welding the high amperage per unit area of cross-section in the protrusions 9 will cause melting thereof and this initiates a good connection and weld along the full free edges of the parallel legs of the part 7. The handgrip is connected by screws 10 positioned with their head in the space 6 and with their shanks in the passage 5. In the embodiment according to the upper part of FIG. 1 such screws are adapted to engage into and through the opening 8. This opening could be provided with screw-thread as shown in FIG. 1, but it is preferred not to do so, but to provide a U-shaped clip 11 as shown in FIG. 3, in the right part thereof, which clip is slid around the central part of the U of member 7. Such clips are sometimes called speed nuts. In both legs of such speed nuts there is an opening as shown in FIG. 3 and the upper one in FIG. 3, which will come closest to the wall of the vessel, is provided with internal screw thread, into which the screw 10 engages with part of its screw-threaded shank. In that case the opening 8 will be so wide as to allow free passage of this shank.

In the embodiment according to the lower part of FIG. 1 and according to FIG. 4 a circular metal block 12 is applied which could consist preferably of a light metal like an aluminum alloy and which has a central screw-threaded bore 13. This block has a single central small protrusion 14, by which it is brought into contact with the wall of the vessel for the welding as described before.

The radial positioning of the parts 7 or 12 with respect to the vessel not only has the advantage of a simple shape and a simple positioning and maintaining in position of parts during welding, but particularly for ceramic handgrips has the advantage that the passages for taking up the screws in the handgrip take up these screws in zones where there is sufficient material of the handgrip to prevent that the head of the screw 10, when driven in with considerable force, will cause cracks or parts breaking off from the somewhat brittle material of the handgrip.

As appears from FIG. 1 the bottoms of the openings 4 are in contact with the endfaces of the U-shaped parts 7 or of the blocks 12 and they could for the situation shown in FIG. 3 be in contact with the top face of the speed nut 11. This avoids a considerable pressure in contact between the handgrip 2 and the wall of the vessel.

What is claimed is:

1. An assembly for attaching a handle or the like to a vessel having a central axis comprising two metal parts secured to the surface of the wall of said vessel, said metal parts being circumferentially spaced along the outer surface of said vessel wall and each extending generally radially outwardly relative to the central axis of said vessel, a handle of generally U-shaped configuration having means defining recesses in the legs thereof, said recesses each having a face defining the bottom thereof, said recesses receiving said metal parts, fastening means extending through said handle and engaging said metal parts within said recesses to secure said handle to said metal parts, said metal parts having end faces spaced from the outer wall of said vessel and extending generally parallel to the outer surface of said vessel wall, said end faces of said metal parts being radially spaced from the outer surface of said vessel wall a greater distance than the corresponding radial spacing of said bottom face of said recesses such that said end faces of said metal parts abut said bottom faces of said recesses so that no part of said handle is in contact with said vessel wall.

2. An assembly according to claim 1 wherein said metal parts are substantially U-shaped each having two legs connected by a web, said legs being substantially perpendicular to said web and being of equal length, said web defining said end face of said metal part.

3. An assembly according to claim 2 wherein said fastening means comprises a separate U-shaped plate nut which embraces the web of said U-shaped metal part, said fastening means further comprising threaded elements which threadly engage said separate U-shaped plate.

4. An assembly according to claims 1 wherein said metal parts consist of metal blocks each having a screw-threaded central bore and a closed bottom.

5. A vessel for domestic use with two metal parts secured to the outer wall thereof at a distance spaced from one another along the periphery of said wall, said metal parts each consisting of a metal block having a screw-threaded central bore and a closed bottom, a handgrip with two recesses in the face thereof bordering said outer wall of the vessel, said recesses engaging around said metal blocks, fastening means each extending through the handgrip and into said central bore of said metal blocks to connect the handgrip to the vessel, said metal blocks being positioned with their end faces, which are remote from the vessel wall, parallel to the adjacent wall part of the vessel such that the fastening means and the metal blocks with their axes are positioned perpendicularly to the wall part of the vessel adjacent thereto and make an angle with one another.

6. A method of attaching a handle or the like to a vessel having a central axis comprising the steps of providing two metal parts, securing said two metal parts to the outer surface of the walls of said vessel such that said two metal parts are circumferentially spaced around the outer surface of said wall, providing said handle with a pair of recesses in which each of said recesses has a face defining the bottom thereof, placing said handle on said vessel so that said recesses receive said metal parts, said metal parts having end faces spaced from the outer wall of said vessel and extending generally parallel to the outer surface of said wall, and fastening said handle to said metal parts by fastening means such that said end faces of said metal parts abut the bottom faces of said recesses so that no part of said handle is in contact with said vessel wall.

* * * * *

UNITED STATES PATENT OFFICE
CERTIFICATE OF CORRECTION

Patent No. 3661296            Dated May 9, 1972

Inventor(s) EMILE PAUL ELIZA HAMER

It is certified that error appears in the above-identified patent and that said Letters Patent are hereby corrected as shown below:

The issued patent should show that an assignment was executed by the inventor to N.V. KONINKLIJKE KAMPER METAALWARENFABRIEK v.h. H. BERK & ZOON on January 30, 1970.

Signed and sealed this 8th day of May 1973.

(SEAL)
Attest:

EDWARD M. FLETCHER, JR.            ROBERT GOTTSCHALK
Attesting Officer                   Commissioner of Patents